United States Patent Office 2,755,314
Patented July 17, 1956

2,755,314

PRODUCTION OF DIBROMOCHLOROFLUOROMETHANE FROM DICHLOROFLUOROMETHANE

Robert J. Reid, Canal Fulton, and Edward S. Hanson and Raymond J. Pikna, Akron, Ohio, assignors to The Firestone Tire & Rubber Company, Akron, Ohio, a corporation of Ohio No Drawing. Application October 14, 1953,
Serial No. 386,124

4 Claims. (Cl. 260—653)

This invention relates to the production of dibromochlorofluoromethane by bromination of dichlorofluoromethane. Bromodichlorofluoromethane is also produced in the reaction. The dibromochlorofluoromethane alone, or in admixture with the bromodichlorofluoromethane, makes a good fire extinguisher and a good solvent. The dibromochlorofluoromethane may be employed as an intermediate in the preparation of a variety of materials. The present process provides a convenient and economic method of preparing the dibromochlorofluoromethane which cannot be prepared conveniently by other methods.

On the reaction of bromine with dichlorofluoromethane, commonly called Freon 21, and the production of dibromochlorofluoromethane, the hydrogen and one of the two chlorines are replaced by bromine.

In carrying out the reaction Freon 21 in admixture with bromine is passed through a hot tube or other suitable reaction chamber wherein the reaction occurs. The reaction products are then passed through a water scrubber where the hydrogen bromide and hydrogen chloride resulting from the bromination are removed together with free bromine, then through a drying tower containing a desiccant, and then to a condensing system. The Freon 21 vapor may be mixed with bromine by any suitable means. However, passage of the vapor through liquid bromine offers a convenient method of forming the mixture and control of the temperature of the bromine enables one to control the ratio of bromine to Freon 21 vapor.

The proportion of the two products is controlled by varying the reaction conditions. Ordinarily, increasing the temperature, bromine concentration and dwell time in the reaction chamber favors production of the dibromo derivative, whereas lower ratios of bromine to Freon 21, lower temperatures and shorter exposure to the reaction conditions result in a greater proportion of the monobromo derivative. Ordinarily the reaction mixture of bromine and Freon 21 contains between 0.5 and 1.5, or preferably 0.7 to 0.9 mole of bromine for each mole of dichlorofluoromethane, and the reaction mixture is maintained at 600 to 700° C., or preferably 625 to 675° C. Excess bromine passes through the reactor without entering into the reaction.

The reactor may be of any convenient shape, but for economy of operation a tubular design is preferred. The reactor may be made of any suitable material of construction and may contain packing of inert material such as Berl saddles or Raschig rings, or it may contain no packing. Any material resistant to bromine and hydrogen halides may be used. Glass, nickel and Monel tubes have been found satisfactory. Ordinarily, some bromine remains in the reaction mixture and this may be recovered by the ordinary methods. The rate of throughput will depend upon the temperature, the contact surface in the reactor and the ratio of surface to volume in the reactor.

EXAMPLE

Freon 21 was vaporized and passed through liquid bromine maintained at a temperature of 38° C., the flow rate of the Freon 21 being maintained at 260 grams per hour, thus providing a molar ratio of bromine to Freon 21 of 0.81. The mixture of vapors was introduced into a Pyrex glass tube 2" in diameter, 78" long, packed with 6 mm. glass Raschig rings. The tube was heated to a temperature of 650° C. The reaction products were passed through a caustic scrubber the top of which was vented to the atmosphere. The water and oil phases were then separated and the bromine removed by reaction with propylene. The oil layer was dried over calcium chloride and distilled, using a distillation column provided with a low temperature head for the removal of the unreacted Freon 21. The following fractions were recovered:

| Temperature | Grams | Product |
|---|---|---|
| Up to 25° C | 100 | Freon 21. |
| 25–50° C | 600 | |
| 50–52° C | 828 | $CBrCl_2F$. |
| 52–76° C | 97 | |
| 76–81° C | 355 | $CBr_2ClF$. |
| Residue | 340 | Probably propylene dibromide. |
| Loss | 175 | Uncondensed Freon 21. |

For comparison, the physical properties of the starting material and two principal products are tabulated:

Physical properties

| | Freon 21 | $CBrCl_2F$ | $CBr_2ClF$ |
|---|---|---|---|
| Boiling point, ° C | 8.9 | 52.8 | 80.3 |
| Specific gravity, 20/4 | 1.3779 | 1.9462 | 2.3173 |
| $N_D^{20}$ | | 1.4322 | 1.4750 |
| Molar refraction, calc | | 24.17 | 27.07 |
| Molar refraction, obs | | 24.24 | 27.49 |
| Molecular weight, calc | 102.93 | 181.84 | 226.30 |
| Molecular weight, obs | | 186 | 220 |

The boiling points have been corrected to sea level.

The dibromochlorofluoromethane was washed with $NaHCO_3$ solution, and then water, and dried before measuring density and refraction.

The example is illustrative. The conditions may be varied to control the ratio of $CBrCl_2F$ and $CBr_2ClF$ produced.

What we claim is:

1. The process of making dibromochlorofluoromethane from dichlorofluoromethane which comprises exposing, to temperatures of substantially 600 to 700° C. a mixture of bromine and dichlorofluoromethane, which mixture contains 0.5 to 1.5 mole of bromine for each mole of dichlorofluoromethane, and replacing the hydrogen and one of the chlorines of at least some of the starting material with bromine.

2. The process of making dibromochlorofluoromethane from dichlorofluoromethane which comprises exposing, to temperatures of substantially 600 to 700° C. a mixture of bromine and dichlorofluoromethane, which mixture contains 0.7 to 0.9 mole of bromine for each mole of dichlorofluoromethane, and replacing the hydrogen and one of the chlorines of at least some of the starting material with bromine.

3. The process of making dibromochlorofluoromethane from dichlorofluoromethane which comprises exposing, to temperatures of substantially 625 to 675° C. a mixture of bromine and dichlorofluoromethane, which mixture contains 0.5 to 1.5 mole of bromine for each mole of dichlorofluoromethane, and replacing the hydrogen and one of the chlorines of at least some of the starting material with bromine.

4. The process of making dibromochlorofluoromethane from dichlorofluoromethane which comprises exposing, to temperatures of substantially 625 to 675° C. a mixture of bromine and dichlorofluoromethane, which mixture contains 0.7 to 0.9 mole of bromine for each mole of dichlorofluoromethane, and replacing the hydrogen and one of the chlorines of at least some of the starting material with bromine.

References Cited in the file of this patent

UNITED STATES PATENTS

| | | |
|---|---|---|
| 2,644,845 | McBee | July 7, 1953 |
| 2,658,086 | Ruh et al. | Nov. 3, 1953 |
| 2,658,928 | Simons et al. | Nov. 10, 1953 |